Sept. 19, 1967  W. RICE  3,343,114
TEMPERATURE TRANSDUCER
Original Filed Dec. 30, 1963  3 Sheets-Sheet 1

INVENTOR
WARREN RICE

BY John S. Graham
ATTORNEY

INVENTOR
WARREN RICE

BY John G. Graham
ATTORNEY

United States Patent Office 3,343,114
Patented Sept. 19, 1967

3,343,114
TEMPERATURE TRANSDUCER
Warren Rice, Tempe, Ariz., assignor to Texas Instruments Incorporated, Dallas, Tex., a corporation of Delaware
Continuation of abandoned application Ser. No. 334,299, Dec. 30, 1963. This application Dec. 6, 1965, Ser. No. 511,787
1 Claim. (Cl. 338—22)

This application is a continuation of my now abandoned application Ser. No. 334,299, Temperature Transducer, filed Dec. 30, 1963.

The present invention relates to an epitaxial semiconductor temperature transducer which, together with appropriate auxiliary equipment, may be used as a very stable, very sensitive thermometer with the special attribute of being highly responsive to temperature changes and to temperature fluctuations of the environment of the transducer.

Heretofore, semiconductor temperature transducers have not been widely used except in the range of cryogenic temperatures which is a highly specialized use in which the response to temperature changes is of little importance, consequently several other types of temperature transducers have been used.

It is recognized that the application problems in industry and in research require of temperature transducers all combinations of stability, sensitivity, response, and ruggedness. Consequently a very large variety of transducers are in use each having certain attributes that especially enable it to meet a range of application requirements. It will be appreciated by those skilled in the art of temperature measurement that it is the extremes of the attributes of stability, sensitivity, response and ruggedness that are most difficult to achieve in a temperature transducer, and that when one of the attributes is of prime importance it is commonly achieved at the expense of compromising the other attributes.

When the stability of the transducer is of prime importance, resistance temperature transducers are commonly used, the resistance transducer together with associated circuitry and readout devices being called a resistance thermometer. In this connection, stability is used to mean that the transducer which is the resistive element of the thermometer retains its physical properties and characteristics precisely over long periods of time and throughout all conditions of use, and a resistive element with good stability enables extremely accurate temperature measurements to be performed. Although resistance transducers made of various materials have been used for special applications, it will be recognized by those skilled in the art that platinum has been the most common material of the resistance transducer when stability is of prime importance because platinum is relatively chemically inert, can be annealed to large grain size, and can be used over a large temperature range over which its resistance vs. temperature characteristics are well established and known. However, platinum has only a moderate coefficient of resistivity change with temperature change. This coefficient can be written $$\frac{1}{\rho}\frac{\partial \rho}{\partial t}$$

where $\rho$ is the resistivity of the material and $t$ is the temperature, and is commonly called the resistance coefficient, and is in general an indication of the relative sensitivity of a resistance transducer made of a material.

Therefore, platinum resistance thermometers sacrifice sensitivity that can be had with other materials in order to achieve great stability. Furthermore, platinum and other metal resistance transducers must consist of long windings of fine wire in order to achieve a desirably high basic resistance at room temperature, since it is known that the sensitivity of a resistance thermometer increases with the basic resistance, other conditions of use being the same. Therefore, stable resistance thermometers of the platinum type have a low response to temperature changes and fluctuations because of bulk and high heat capacity. Furthermore, platinum transducers must have elaborate support for the fine wire composing the resistive element in order to prevent thermal stresses in the wire which would be detrimental to the stability of the transducer, therefore platinum resistance thermometers are inherently relatively fragile rather than rugged.

When sensitivity of the transducer is of prime importance, resistance transducers are commonly used but of the type known as the thermistor, the thermistor being a rod, bar, ball or sheet of compacted and processed material including certain oxides, provided with two connecting wires and possessing semiconductor properties. As is well known by those skilled in the art, thermistors possess the largest resistance coefficient of any known resistance transducer in the range of temperature from cryogenic temperature to approximately 550° F., the coefficient being temperature dependent but being on the order of 100 times that of the metals, including platinum, commonly used in other resistance transducers. A thermistor together with associated circuitry and readout devices can constitute a highly sensitive resistance thermometer as is well known. However, because of the heterogeneous nature of the material from which a thermistor is fabricated and because of the manner in which the particles must be sintered together and because of the necessary manner of attachment of the connecting wires, thermistors are known to be relatively unstable, being subject to changes of the basic resistance of the thermistor and subject to minor changes in the relationship between resistance and temperature for the thermistor due to both aging and use. The thermistor is therefore considered by those skilled in the art to be a highly sensitive but relatively unstable transducer suitable for wide routine application but not suitable for the highly precise measurement of temperature in which stability is necessary. However, the thermistor is relatively rugged due to its construction. Furthermore, the thermistor is commonly fabricated in very small sizes and compact geometries which causes it to possess high response to temperature changes and fluctuations, not however as high response as is needed in many temperature measurement requirements. It is also well known that thermistors possess a negative resistance coefficient in contrast to metal transducers which have a positive coefficient. This fact is of little importance from the standpoints of stability, sensitivity, ruggedness and response but is of great and hitherto unique importance in certain applications of the thermistor in control circuits, electrical regulation circuits, thermal switching circuits, and the like.

When response of the transducer to sudden temperature change or to temperature fluctuations is of prime importance, thin film metallic resistance transducers are commonly used. Thin film transducers are commonly fabricated by the vacuum deposition of films of metal, for example platinum, of a thickness ranging from approximately .05 mil to approximately 2 mils, of an electrically insulating substrate which is usually of a material which is also an insulator for heat, such as glass. Connecting wires or other leads are attached to the film by vacuum deposition of metallic leads or by some variety of wire bonding to the film. The resulting thin-film transducer with associated circuitry and readout devices constitutes a resistance thermometer having very high response, as is well known by those skilled in the art. However, as is also well known, thin-film transducers do not possess the relationship between temperature and resistivity which is characteristic of a bulk sample of the metal from which the film is made, the relationship between temperature and resistivity for the thin film transducer being greatly effected by surface effects due to the large surface area as compared with the volume of the material and also due to the interface between the thin metal film and the insulating substrate. Furthermore, the overall characteristics of a thin-film transducer are greatly dependent upon the exact distribution of the film thickness, upon the kind and amount of impurity contamination incurred during fabrication, and upon details of the manner of attachment of the connecting wires or other leads. These facts constitute disadvantages in the application of metal thin-film transducers since they require that each transducer be separately calibrated and recalibrated frequently in use since each transducer possesses individual characteristics. Furthermore, thin-film transducers are inherently unstable and in general possess a smaller coefficient of resistance than the bulk metal and are therefore relatively insensitive. In various styles of fabrications, they are sometimes very fragile and sometimes moderately rugged. Thin-film transducers inherently have the disadvantage that the film and the substrate possess different coefficients of thermal expansion which can cause difficulty in fabrication and can cause separation of the film from the substrate under some conditions of use in which large temperature changes are involved. All of the foregoing will be recognized by those skilled in the art.

When response of the transducer to rapid temperature fluctuations is of prime importance, another type of resistance thermometer known as the hot-wire anemometer is in common use. The hot-wire anemometer is primarily an instrument for the measurement of the fluctuating components of the velocity in a turbulent fluid stream but is used also to measure the fluctuating temperature at a point in a turbulent fluid stream. The hot-wire anemometer consists of a readout device, associated circuitry, and a resistance temperature transducer in the form of a very thin-wire, for example, a wire of tungsten approximately .040 inch in length and .135 mil in diameter. The wire comprises the resistive element and is supported with a slight tension between two thin metal supports which also form the electrical connecting wires or leads. In the measurement of temperature fluctuations in a turbulent fluid stream, the wire responds very rapidly to the changing temperature of the fluid stream due to the very small size and heat capacity of the wire. Furthermore, the small size of the wire enables the measurement to be made essentially at a point in the fluid, which is desirable in this use. However, the hot-wire anemometer has certain disadvantages in the measurement of temperature. The use of a metal wire limits the sensitivity of the measurement to that enabled by the coefficient of the metal. This fact requires that the associated circuitry and readout device include an expensive high-gain amplifier with good linearity. Furthermore, the ultimate resolution of the measurement is limited by the occurrence of noise in the system due to the high-gain amplifier required. Also, the hot-wire is extremely fragile and difficult to clean and difficult to replace when broken. As will be recognized by those skilled in the art, the hot-wire anemometer used to measure temperature fluctuations is only moderately stable, and moderately sensitive, which causes an ultimate limitation in resolution of temperature, and is very fragile, but of sufficiently high response to satisfy even extreme response requirements in applications.

It is pertinent to review here another use of the hot-wire anemometer which is the most important use of the instrument and which is to measure the fluctuating components of velocity in a turbulent fluid stream. In this use, the instrument is arrayed as described for temperature measurement, but in addition, sufficient and constant current is passed through the hot-wire to maintain it at an average temperature of from 10 to 100° F. above the average temperature of the fluid stream. The resistance of the hot-wire at any time then is related to the component of fluid velocity normal to the wire, consequently, associated circuitry and readout devices produce as an end result an accurate measurement of that velocity component as a function of time. Another means of operation is also occasionally used in which the wire temperature is maintained constant by associated feed-back type circuitry, rather than the current being maintained constant, but the underlying principles and the resulting effects are substantially the same. As will be understood by one skilled in the art, any mode of operation of a hot-wire anemometer depends only on the provision of an extremely responsive resistance transducer of small physical size provided with electrical connecting wires or leads for supplying heating and/or measuring current to the transducer.

The bulk of temperature measurement and control applications in science and industry do not require the extreme limits possible in regard to stability or sensitivity or response. Rather, in these applications, first cost and convenience of the measurement system are of primary concern. Therefore, a variety of simpler resistance thermometers exist for these uses as well as a variety of thermometers based on other principles than that of a change of resistance, including as examples the mercury-in-glass thermometer and the thermocouple transducer used with associated circuitry and the constant volume thermometer. It will be recognized by one skilled in the art of temperature measurement that the various resistance transducers described for the extreme requirements of stability and sensitivity and response can also be adapted in simpler form for the simpler uses with an improvement in ruggedness and reliability, and a decrease in first cost and in the quality and amount of associated circuitry and equipment.

As is known by those skilled in the art, a vast scientific and engineering literature exists concerning temperature measurement and including additional description and additional technology concerning the temperature transducers described in the foregoing.

It has been the objective of several earlier experimenters and investigators to devise a resistance temperature transducer which would combine the attributes of stability, high sensitivity, very high response, ruggedness, and practical first cost. For example, it is well known that the conventional semiconductor diode displays a large change in forward current with a unit change in temperature of the diode, at constant voltage drop across the diode. In this case, the diode is commonly made of single-crystal germanium or single-crystal silicon and incorporates a p-n or a n-p junction, through which the current passes. As shown by both the theory of semiconductor action and by direct experimentation, it is known that simple diodes can be used as resistance temperature transducers but that the passage of the current through the junction causes a large amount of electrical noise which renders the diode unsatisfactory as a temperature transducer. Furthermore, it is well known that the current in a conventional transistor, at constant voltage bias, displays a large change in current with a unit change in temperature of the transistor. This can be shown to be in all ways similar to the performance of the diode previously described and it is known from direct experimentation that the transistor can be used as a resistance thermometer but that a large amount of electrical noise occurs because the current passes through a junction and this renders the transistor unsuitable as a temperature transducer.

Accordingly, it is an object of the present invention to provide a temperature transducer combining the desired attributes of stability, high sensitivity, very high response, and a degree of ruggedness, with little or no increase in first cost and in amount and quality of associated circuitry and equipment required as compared with transducers having a less desirable combination of stability, sensitivity, response, and ruggedness.

Another object to the invention is to provide a resistance temperature transducer of single-crystal semiconductor material wherein the material is extremely stable with regard to basic resistance at a reference temperature because of its single-crystal nature, containing no grain boundaries and a controlled amount of impurities and crystalline imperfections of known effect.

Another object of the invention is to provide a resistance temperature transducer wherein the material can be chosen as germanium or silicon or another of the well known semiconductor materials which can be produced in single-crystal form thereby enabling the temperature transducer to use the properties of the different semiconductor materials to be adapted for the measurement of temperature over different ranges of temperature.

Another object of the invention is to provide a resistance temperature transducer of single-crystal semiconductor material especially composed of a semiconductor structure consisting of an epitaxially deposited layer of material upon a substrate wherein the layer and the substrate are the same basic single-crystal semiconductor material but contain greatly different amounts of suitably chosen impurities of a specific type and wherein the substrate contains so much impurity and the layer contains so little impurity that the resistance of the entire structure depends sensibly only upon the temperature of the layer and wherein due to the epitaxial nature of the layer it can be and is made very thin thus leading to extremely high response of the resistance of the structure to sudden temperature changes and to temperature fluctuation.

Another object of the invention is to provide a resistance temperature transducer composed of an epitaxial semiconductor structure suitably mounted and provided with electrical connecting wires or other leads enabling the transducer to be connected in a temperature measurement system wherein the transducer provides stability, high sensitivity, extremely high response, and a degree of ruggedness.

Another object of the invention is to provide a variety of different structures, the differences being in the amount and kind of impurity incorporated in the substrate and in the layer, and being in the absolute and relative thicknesses of the substrate and the layer, and being in the manner of the attachment of the electrical connecting wire and leads and in the way in which an ohmic contact is made at the semiconductor surfaces, and being in the shape to which the active surface of the transducer is etched or otherwise formed to achieve advantages due to special geometry with regard to response characteristics of the transducer, all of the foregoing in order to enable the transducers to be adapted to the extreme variety of requirements in the measurement of temperature in science and industry.

A further object of the invention is to provide a specifically adapted version of the transducer to enable it to be used as a highly responsive temperature or velocity transducer in a turbulent fluid stream when used with associated circuitry and readout devices identical in principle to those currently used with the hot-wire transducer in the measurement system known as the hot-wire anemometer, and wherein in the use of the present transducer means are provided for passing heating current through the substrate portion only of the transducer when it is used as a velocity transducer, whereby the transducer will provide a measurement of the temperature fluctuations or of the velocity fluctuations as a function of time with an equivalent or better response than is achieved with the hot-wire and with a much greater sensitivity and ultimate resolution than is achieved with the hot-wire and with a greater degree of ruggedness, greater ease of cleaning and of replacement following breakage, with greater stability, and with an ability to provide almost any desired geometry for the temperature-sensitive portion of the transducer thus providing advantages over the fixed geometry of the hot-wire.

Further objects and advantages of the present invention may be apparent from the following specification, appended claim and accompanying drawings in which:

Figure 5:
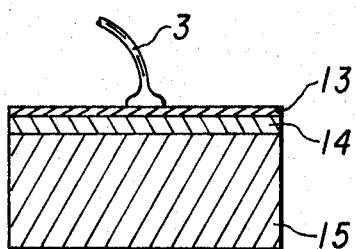

FIG. 5 is a cross-sectional view of a single-crystal semiconductor structure showing a very thin epitaxial p-type layer of low resistivity on a very thin p-type epitaxial layer of high resistivity on a thin p-type substrate of low resistivity and showing one electrical connecting wire fastened as an ohmic contact to the surface of the exposed p-type epitaxial layer and one electrical connection fastened as an ohmic contact to the substrate.

Figure 6:
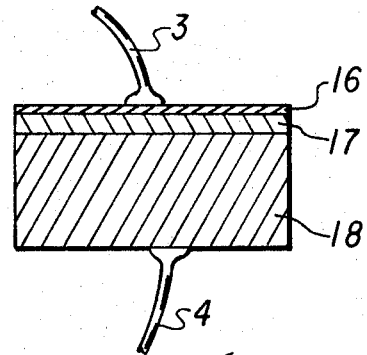

FIG. 6 is a cross-sectional view of a single-crystal semiconductor structure showing a very thin epitaxial n-type layer of low resistivity on a very thin n-type epitaxial layer of high resistivity on a thin n-type substrate of low resistivity and showing one electrical connecting wire fastened as an ohmic contact to the surface of the exposed n-type epitaxial layer and one electrical connection fastened as an ohmic contact to the substrate.

Figure 7:
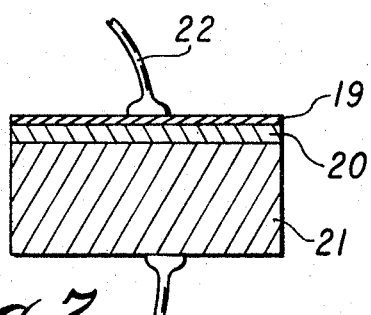

FIG. 7 is a cross-sectional view of a single-crystal semiconductor structure showing a very thin metal layer on a very thin p-type epitaxial semiconductor layer of high resistivity on a thin p-type substrate of low resistivity and showing one electrical connecting wire fastened as an ohmic contact to the surface of the exposed metal layer and one electrical connection fastened as an ohmic contact to the substrate.

Figure 8:
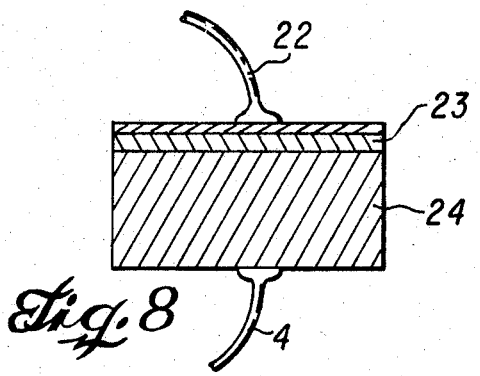

FIG. 8 is a cross-sectional view of a single-crystal semiconductor structure showing a very thin metal layer on a very thin n-type epitaxial semiconductor layer of high resistivity on a thin n-type substrate of low resistivity and showing one electrical connecting wire fastened as an ohmic contact to the surface of the exposed metal layer and one electrical connection fastened as an ohmic contact to the substrate.

Figure 9:
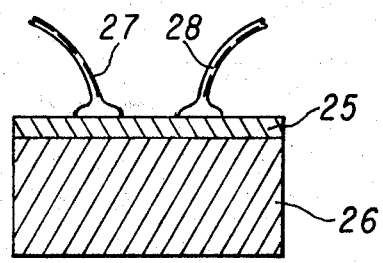

FIG. 9 is a cross-sectional view of a single-crystal semiconductor structure showing a very thin n-type epitaxial semiconductor layer of high resistivity on a thin p-type substrate of convenient resistivity and showing a junction formed near the interface between the layer and the substrate and showing two electrical connecting wires fastened as ohmic contacts at a desired distance apart on the surface of the n-type epitaxial layer and showing no connections to the substrate.

Figure 10:
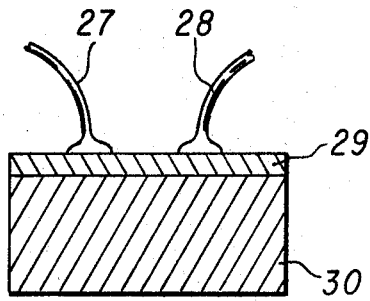

FIG. 10 is a cross-sectional view of a single-crystal semiconductor structure showing a very thin p-type epitaxial semiconductor layer of high resistivity on a thin n-type substrate of convenient resistivity and showing a junction formed near the interface between the layer and the substrate and showing two electrical connecting wires fastened as ohmic contacts at a desired distance apart on the surface of the p-type epitaxial layer and showing no connection to the substrate.

Figure 11:
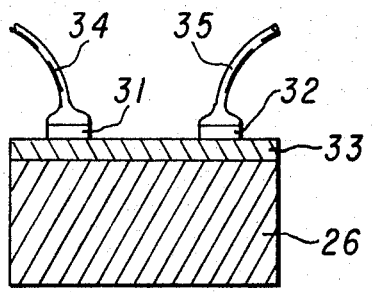

FIG. 11 is a cross-sectional view of a single-crystal semiconductor structure showing a very thin n-type epitaxial semiconductor layer of high resistivity on a thin p-type substrate of convenient resistivity and showing a junction formed near the interface between the layer and the substrate and showing two very thin metal spots or strips on the exposed surface of the n-type epitaxial layer and making ohmic contact to it with a desired spacing and geometry between the metal spots or strips and showing one electrical connecting wire fastened as an ohmic contact to each of the thin metal spots or strips and showing no connections to the substrate.

Figure 12:
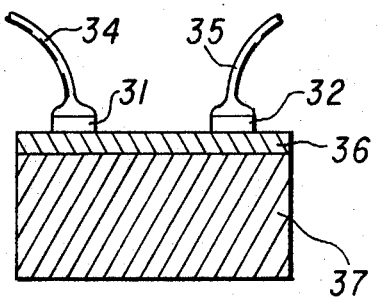

FIG. 12 is a cross-sectional view of a single-crystal semiconductor structure showing a very thin p-type epitaxial semiconductor layer of high resistivity on a thin n-type substrate of convenient resistivity and showing a junction formed near the interface between the layer and the substrate and showing two very thin metal spots or strips on the exposed surface of the p-type epitaxial layer and making ohmic contact to it with a desired spacing and geometry between the metal spots or strips and showing one electrical connecting wire fastened as an ohmic contact to each of the thin metal spots or strips and showing no connections to the substrate.

Figure 13:
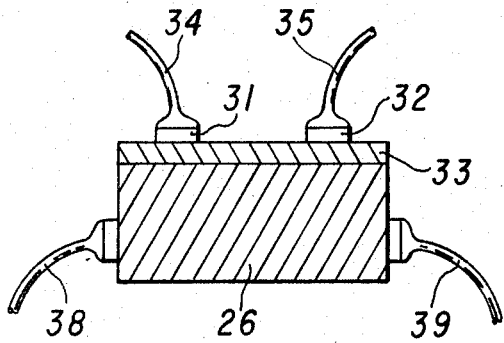

FIG. 13 is a cross-sectional view of a single-crystal semiconductor structure identical to any one of the basic structures shown in FIG. 1 through FIG. 12 but having in addition two electrical connecting wires fastened as ohmic contacts at two points a desired distance apart on the substrate.

Figure 14:
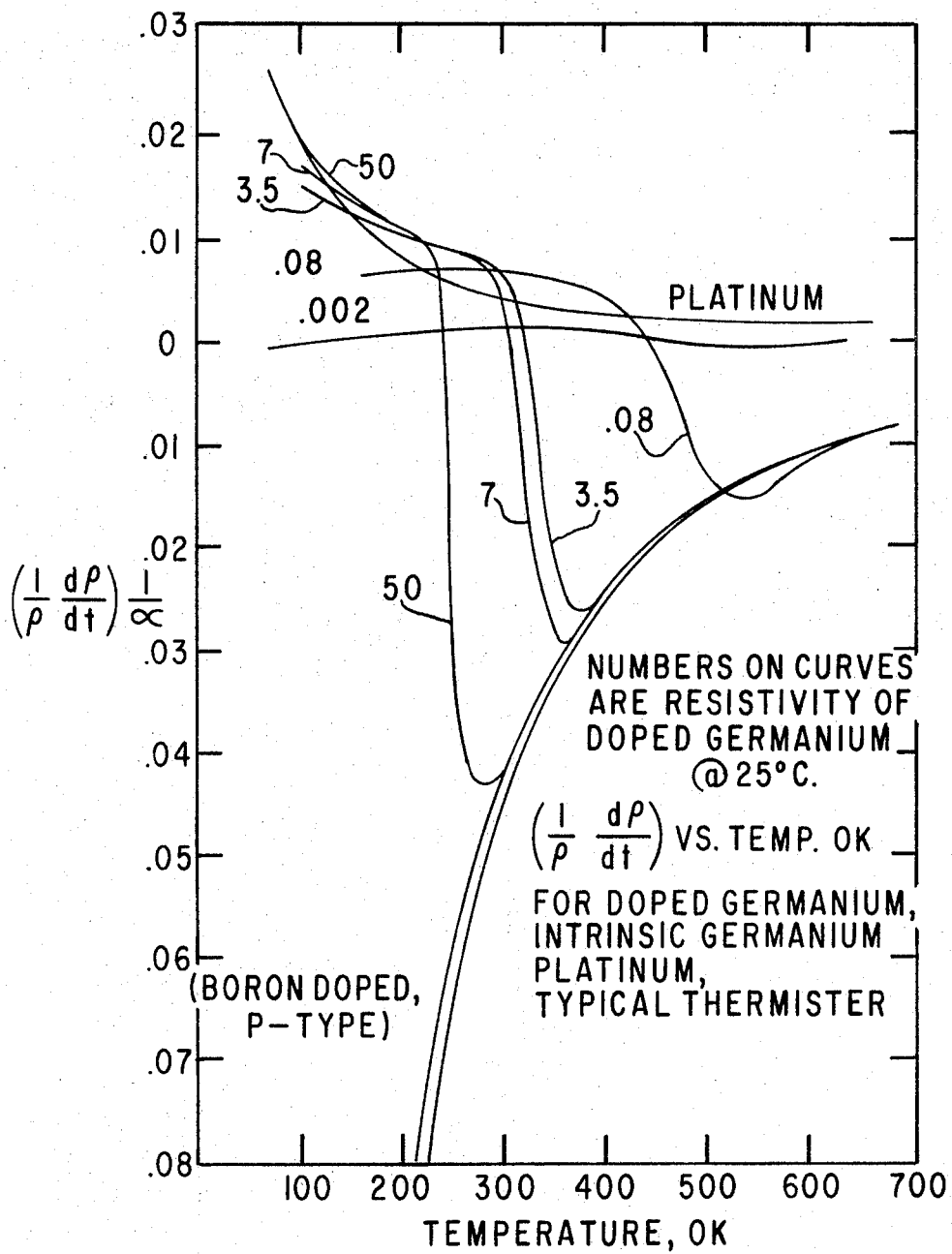

FIG. 14 is a graphical presentation of the relationship between the resistance coefficient $$\frac{1}{\rho}\frac{d\rho}{dT}$$

and the temperature for platinum, for a typical thermistor material, and for p-type germanium having boron as the impurity and having the various resistivities shown at the reference temperature of 25° C. In the presentation of the properties of germanium therefore, the resistance at 25° C. is a parameter. Furthermore, FIG. 14 specifically enables comparison of the resistance coefficient $$\frac{1}{\rho}\frac{d\rho}{dT}$$

for platinum, for a typical thermistor material, and for germanium of the various basic resistivities, germanium being chosen purely as an example of the behavior of a semiconductor single-crystal material at the different impurity levels and with temperature.

The term "epitaxial layer" as used herein defines a thin layer of single-crystal semiconductor material which has been formed on a single-crystal semiconductor substrate of the same crystalline form by a process of epitaxial deposition or epitaxial crystal growth. It will be understood by those skilled in the art that many distinct epitaxial deposition processes are in existence and that the epitaxial layer disclosed in FIG. 1 through FIG. 13 may be formed by any one of the processes and that the object of an epitaxial process is to provide very thin single-crystal oriented layers with electrical properties which are slightly or greatly different from the electrical properties of the substrate and including if desired differences in electrical resistivity and differences in impurity element and/or impurity type, whether p-type or n-type.

As an example of a means of accomplishing the fabrication of an epitaxial layer, a particular kind of epitaxial deposition process is described, being only illustrative of the existence of the means of achieving such layers and illustrative of the epitaxial structures obtainable by such processes. The process used as an example is the vapor deposition epitaxial process for the deposition of germanium, it being understood that such processes also exist for other semiconductor materials. In the process, single-crystal slices of germanium which have been sawed from larger single-crystals of germanium so as to expose a desired crystal plane and which has been lapped and chemically etched to great smoothness and with precise crystal orientation, form the substrate on which epitaxial growth of the layer is produced. Advantage is taken of a known chemical reaction such as

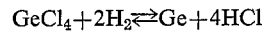

which reaction proceeds partially and reversibly when the reactive mixture is brought to a temperature near but below the melting point of germanium. In particular, free germanium is formed as a reaction product. In practice, the substrate is held at the desired deposition temperature in a suitable reaction vessel and the reactive mixture is passed over it, having been supplied, metered and blended in suitable ratio by commonly known means. The reaction takes place over the substrate which results in the free germanium formed by the reaction migrating to the crystalline surface of the substrate and attaching to the substrate crystal lattice in such a way as to form a layer of germanium on the original substrate having the same crystal pattern and orientation as that of the substrate. The layer is said to be epitaxially deposited or epitaxially grown and is said to be an epitaxial layer. The process takes place slowly and is subject to a very high degree of control which enables the layer to be grown very uniformly over a substrate at least as large as one inch square and to be grown to any small desired thickness in a precise manner. In order to achieve the desired difference in electrical properties between the layer and substrate, the substrate is originally prepared with the electrical properties desired for it during the forming of the original single-crystal of germanium, and the desired electrical properties of the layer are produced by carrying out a chemical reaction providing a controlled amount of a desired impurity concurrently with the reaction which supplies the germanium. In the case of a p-type layer, the reaction commonly supplies boron and in the case of an n-type layer the reaction commonly supplies phosphorus. It will be understood by those skilled in the art that the type of resulting layer, whether n-type or p-type, and the electrical properties of the layer, especially the property electrical resistivity, are definitely dependent upon the kind of impurity added to the layer and the amount of impurity added to the layer. In general, low resistivity results from a large amount of added impurity and high resistivity results from a small amount of added impurity. Therefore, the vapor deposition epitaxial process is one means of producing slices of semiconductor materials incorporating the semiconductor portions of the structures depicted in FIGS. 1 through 13.

As shown in FIGS. 1 through 13, the invention comprises in each of the various individual structures a very thin epitaxial layer which is the part of the structure which changes resistivity greatly with temperature change of the structure and which imparts to the structure its ability to function as a temperature transducer and which enables it furthermore to be stable because of the single-crystal nature of the layer and which enables it furthermore to be highly responsive because of the very small dimensions of the layer particularly with regard to thickness.

FIG. 14 displays the properties of a semiconductor material with regard to the way in which the resistant coefficient is dependent upon both the temperature of the material and the amount of impurity in the material. FIG. 14 is quantitatively correct only for germanium but it will be appreciated by those skilled in the art that similar dependence is displayed by other semiconductor materials and that germanium is displayed in FIG. 14 purely as an example of the phenomena involved in the use of a semiconductor material in a temperature transducer. The properties of the metal platinum and of a typical thermistor material are also shown in FIG. 14. It is seen from FIG. 14 that the thermistor material has everywhere a single curve representing its resistivity-temperature relation and that the resistance coefficient is everywhere negative and everywhere very large. It is also seen that platinum has everywhere a single curve representing its resistivity-temperature relation and that the resistance coefficient is everywhere positive and everywhere much smaller than the coefficient for the thermistor material. It is further seen that the individual curves representing the resistivity-temperature relation for a semiconductor result from the fact that the amount of impurity present in the semiconductor forms a parameter. In particular, when a very large amount of an impurity is present the resistance coefficient is very small. This is the reason that most of the substrates shown in FIG. 1 through FIG. 13 are specified as of low resistivity material, that is, material with a large amount of impurity; in this way, the substrate will not sensibly change in resistance as the temperature of the structure is changed. Furthermore, in particular, when a very small amount of an impurity is present the resistance coefficient is very large, and is negative, and is essentially the same as is the coefficient for the thermistor material. This is the reason that most of the layers shown in FIG. 1 through FIG. 13 are specified as of high resistivity material, that is, material with a small amount of impurity; in this way, the change in resistance of the layer as the temperature of the structure is changed is very large, giving the epitaxial semiconductor temperature transducer approximately the same sensitivity as the thermistor at any specified temperature. In the region of impurity content between the extremes of very large and very small, it is seen that the semiconductor material characteristics form a family with the impurity content as a parameter, and that in general, the impurity can be chosen to provide a positive coefficient or a negative coefficient at any specified temperature and that for various temperature and impurity-content combinations, the coefficient is always less than that for the thermistor material but is mostly greater than that for platinum.

It will be clear from the foregoing based on consideration of FIG. 14 that the epitaxial structures depicted in FIG. 1 through FIG. 13 provide stability because of the single crystal nature of the material and provide sensitivity because of the choice of a high resistivity for the material of the epitaxial layer, the electrical resistivity of the epitaxial layer desirably ranging from .05 ohm-centimeter to almost intrinsic value; and provide a high response because only the layer responds to a temperature change and the layer is very thin and therefore responds extremely rapidly.

To further clarify the feature of the structures depicted in FIG. 1 through FIG. 13 which causes the present invention to have very high response to temperature change and to temperature fluctuations, reference is made to a large body of scientific and technical literature in which it is shown that a body subjected to a time varying surface temperature develops a time varying temperature distribution within the body definitely related to the thermal properties of the material of the body and also definitely related to the mathematical form of the time varying surface temperature. In particular, in the case of a sinusoidally varying surface temperature expressed by the equation $t_s = t_o \cos \omega\theta$ where $t_o$ is the amplitude of excursion of the surface temperature from the time-average of the surface temperature and where $\omega$ is the frequency and $\theta$ is the time measured from an instant when the surface temperature is $t_0$, it has been shown that the temperature distribution in a semi-infinite body is, as a function of space and time, $$t(x,\theta) = t_o e^{-\sqrt{\frac{\omega}{2\alpha}}x} \cos\left(\omega\theta - \sqrt{\frac{\omega}{2\alpha}}x\right)$$

where $x$ is the distance measured from the surface into the body and where $\alpha$ is the thermal diffusivity of the material of the body. Furthermore, it has been shown that the average temperature of a surface layer of the body of thickness $d$ is given by $$ta = \frac{t_o}{2\sqrt{\frac{\omega}{2\alpha}}d} \left\{ -e^{-\sqrt{\frac{\omega}{2\alpha}}d}\left[\sin\left(\omega\theta - \sqrt{\frac{\omega}{2\alpha}}d\right) + \cos\left(\omega\theta - \sqrt{\frac{\omega}{2\alpha}}d\right)\right] + \cos\omega\theta + \sin\omega\theta \right\}$$

Close examination of the equation for the average temperature of the layer has been made and it has been shown that, when $d$ is very small, that the average temperature of the layer remains very nearly the same as the surface temperature even as the frequency becomes very large. Specifically, for the semiconductor germanium as an example, numerical calculations have been carried out which show that the average temperature of the layer departs from the surface temperature by an amount not greater than 10% of the surface temperature at any time during the temperature cycle at a frequency of 10,0000 cycles per second when $d$ is as large as .20 mil and that the departure is much less at lower frequencies and layer thickness. Furthermore, the calculations for a semi-infinite body are conservative for a thin body such as is constituted by the transducer which is the present invention, provided that the back of the substrate is connected with a poor heat conductor and are not appreciably changed by connecting the back of the substrate to a good heat conductor.

By means of the foregoing equations and reasoning, it will be clear to those skilled in the art of temperature measurement that the structures depicted in FIG. 1 through FIG. 13 will be extremely responsive to a sudden temperature change and to temperature fluctuations at high frequency or of random wave form when the surface of the structure is exposed to the temperature and when the transducer is connected to suitable circuitry and readout devices. It is essential to realize, as was seen from FIG. 14, that only the layer portion of the structure changes resistance with temperature change of the structure because of the specification of low resistivity of the substrate and high resistivity of the layer.

It will be understood that the structures disclosed in FIG. 9 through FIG. 13 are not dependent on the substrate resistivity since in these structures the potential barrier junction provides electrical isolation of the layer from the substrate.

Figure 1:
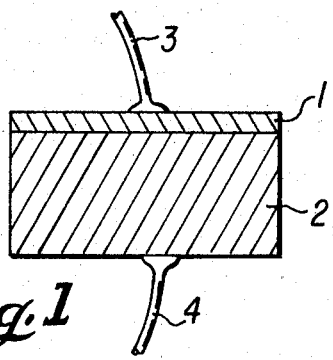
FIG. 1 is a cross-sectional view of a single-crystal semiconductor structure showing a very thin epitaxial p-type layer of high resistivity on a thin p-type substrate of low resistivity and showing one electrical connecting wire fastened as an ohmic contact to the surface of the epitaxial layer and one electrical connection fastened as an ohmic contact to the substrate.

The structure disclosed in FIG. 1 is composed of a very thin epitaxial layer 1 of p-type semiconductor material of high resistivity on a thin substrate of p-type material of low resistivity 2 with one electrical connecting wire 3 fastened as an ohmic contact to the surface of the epitaxial layer and one electrical connection 4 fastened as an ohmic contact to the substrate. It will be understood that the ohmic connections may be any desired means such as thermocompression bonding or, in the case of the substrate connection, alloying the structure to a gold plated support strut or to a gold plated crystal can, provided only that means are taken as known by those skilled in the art to insure that the contacts are ohmic rather than rectifying. The current path during operation is in either direction through the structure. It will be understood that the current will be largely confined to a portion of the layer directly beneath the attached wire but will be distributed rather uniformly throughout the substrate because of the extreme thinness of the layer and its high resistivity and because of the relative thickness of the substrate and its low resistivity. Therefore, with regard to response, the structure disclosed in FIG. 1 is limited by the phenomena of heat-sinking of the active part of the layer by the attached wire. It will be understood that the wire attached to the layer is very small and that the structure disclosed in FIG. 1 is highly responsive but not as responsive as some of the structures depicted by FIG. 2 through FIG. 13. However, the structure disclosed in FIG. 1 is stable and sensitive and rugged. It will be understood that any desired mounting may be provided for the structure, the manner of mounting being dependent on the intended application and not being a concern of the present invention. The plan view of the structure is dictated also by the intended application and may be any desired shape and size subject only to the limitation that it must be at least large enough to enable attachment of the electrical connections.

Figure 2:
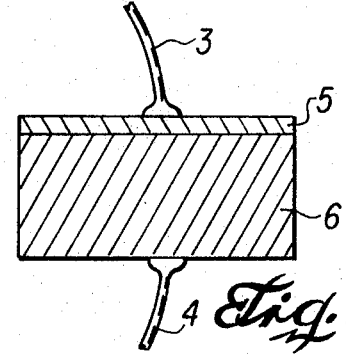
FIG. 2 is a cross-sectional view of a single-crystal semiconductor structure showing a very thin epitaxial n-type layer of high resistivity on a thin n-type substrate of low resistivity and showing one electrical connecting wire fastened as an ohmic contact to the surface of the epitaxial layer and one electrical connection fastened as an ohmic contact to the substrate.

The structure disclosed in FIG. 2 is identical to that disclosed in FIG. 1 except that both the layer 5 and the substrate 6 are n-type. All considerations are otherwise the same for the structures of FIG. 1 and FIG. 2.

Figure 3:
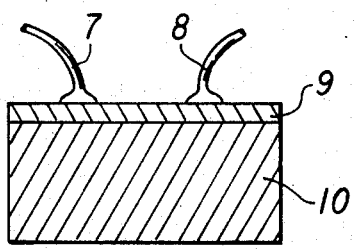
FIG. 3 is a cross-sectional view of a single-crystal semiconductor structure showing a very thin epitaxial p-type layer of high resistivity on a thin p-type substrate of low resistivity and showing two electrical connecting wires fastened as ohmic contacts to the surface of the epitaxial layer at a desired distance apart and showing no connections to the substrate.

The structure disclosed in FIG. 3 is identical to that disclosed in FIG. 1 except that two connecting wires 7, 8 are provided at the surface of the epitaxial layer 9 at a desired distance apart and no connection is made to the substrate. In this case, the current enters at one connecting wire, is confined within the layer to a region directly below the connecting wire, then flows through the substrate 10, then enters the layer directly below the second connecting wire and is confined within the layer to a region directly below that wire, and finally leaves the structure through the second connecting wire. The direction of flow of electrical current may be in either direction. In the structure disclosed in FIG. 3, the spacing between the connecting wires may be chosen to result in any desired overall resistance for the transducer above some limiting minimum resistance, which fact is useful in providing transducers for various applications.

Figure 4:
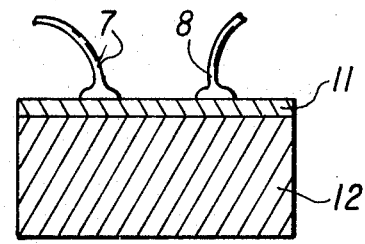
FIG. 4 is a cross-sectional view of a single-crystal semiconductor structure showing a very thin epitaxial n-type layer of high resistivity on a thin n-type substrate of low resistivity and showing two electrical connecting wires fastened as ohmic contacts to the surface of the epitaxial layer at a desired distance apart and showing no connections to the substrate.

The structure disclosed in FIG. 4 is identical to that disclosed in FIG. 3 except that both the layer 11 and the substrate 12 are n-type. All considerations are otherwise the same for the structures disclosed in FIG. 3 and FIG. 4.

The structure disclosed in FIG. 5 is composed of a very thin epitaxial layer 13 of p-type semiconductor material of low resistivity on a very thin epitaxial layer 14 of p-type semiconductor material of high resistivity on a thin p-type substrate 15 of low resistivity. It is one purpose of the top layer 13 to distribute the electrical potential of the upper connecting wire 16 over an increased area of the surface of the active high resistivity layer 14 thereby causing a much larger portion of the active layer 14 to carry the measuring current and contribute to the measured resistance of the structure. In this way, the effect of heat-sinking of the active portion of the high resistivity layer 14 by the connecting wire 16 is made much smaller and the transducer is made much more responsive. It is another purpose of the layer 13, in that it causes a current flow path of much larger cross-sectional area, to reduce the overall resistance of the transducer to a much lower value than that obtained without the layer 13 which is an advantage in providing transducers of low resistance for certain and various applications. In the structure disclosed in FIG. 5 the current flow may be in either direction but the current is spread by the low resistivity of the layer 13 so that the current flows through a large portion of the layer 14 and through the substrate 15. Both the upper and lower connecting wires are fastened with ohmic contact.

The structure disclosed in FIG. 6 is identical to that disclosed in FIG. 5 except that the low resistivity layer 16 and the high resistivity layer 17 and the low resistivity substrate 18 are all n-type. All considerations are otherwise the same for the structures disclosed in FIG. 6 and FIG. 5.

The structure disclosed in FIG. 7 is composed of a very thin metal layer 19 on a very thin p-type epitaxial semiconductor layer of high resistivity 20 on a thin p-type substrate of low resistivity 21. The metal layer 19 may be any of several metals including gold and may be formed in any of several ways, for example, by vacuum deposition. The metal layer makes ohmic contact with the epitaxial layer 20. The metal layer may be, but is not necessarily, alloyed to the epitaxial layer by raising the structure just to the eutectic temperature of the metal-semiconductor system in order to assure an ohmic low resistance contact between the metal and the semiconductor, as will be understood by those skilled in the art of device fabrication with semiconductor materials. It is the purpose of the very thin metal layer 19 to distribute the electrical potential of the upper connecting wire 22 over a large area of the surface of the high resistivity layer 20 thereby causing a much larger portion of the layer 20 to be active in carrying the measuring current and to contribute to the measured resistance of the structure. In this way, the effect of heat-sinking of the active portion of the high resistivity layer 20 by the connecting wire 22 is made very small and the transducer is made much more responsive. Furthermore, the overall resistance of the transducer is reduced to a smaller value which is an advantage in providing transducers of low resistance for certain and various applications. In the structure disclosed in FIG. 7, the current flow may be in either direction but the current flows through a large portion of the layer 20 and through the substrate 21. Both the upper and lower connecting wires are fastened with ohmic contact.

The structure disclosed in FIG. 8 is identical to that disclosed in FIG. 7 except that the epitaxial layer 23 and the substrate 24 are both n-type. All considerations are otherwise the same for the structures disclosed in FIG. 8 and FIG. 7.

The structure disclosed in FIG. 9 is composed of a very thin n-type layer of semiconductor material of high resistivity 25 on a thin p-type substrate of any desired resistivity 26, with two connecting wires 27 and 28 fastened as ohmic contacts at a desired distance apart on the surface of the n-type layer. In the structure disclosed in FIG. 9, the n-type layer may be an epitaxially deposited layer or it may be formed by solid state diffusion of an n-type impurity into the p-type substrate, as will be understood by one skilled in the art of manufacture of semiconductor devices. The use of an n-type epitaxial layer is the preferred construction because such a layer can be made uniform in resistivity and because the layer can be deposited on a p-type substrate of any resistivity whereas an n-type layer produced by diffusion results in a distributed and non-uniform resistivity in the n-type layer and furthermore requires careful selection of a medium resistivity or high resistivity p-type substrate. In the structure disclosed in FIG. 9 it is to be understood that a n-p or a p-n junction is present, depending on the use of nomenclature and on the direction of the measuring current flow caused in the transducer. In the case of use of an epitaxial n-type layer, the junction is formed near the physical interface between the substrate and the layer. In the case of use of a diffused n-type layer, the junction is located at a depth dependent upon the specie of n-type impurity used, the diffusion time, the diffusion temperature, and the kind of semiconductor material and also on other factors, as will be understood by those skilled in the art, but all the factors are to be controlled so as to result in an n-type region of the desired thickness and average resistivity above the junction. Regardless of the processes by which the n-type layer and the junction are produced, it is to be understood that the flow of measuring current in the structure is confined to the n-type layer or region, being from connecting wire 27 through the n-type layer to connecting wire 28, or vice-versa, depending on the electrical polarity applied to the transducer. The current is so confined because the junction provides a potential barrier, as is well understood by those skilled in the art. Because the current does not flow across the junction, no electrical noise is introduced into the measurement by the presence of the junction. Because of the current flow path, a large portion of the high resistivity n-type layer 25 is active in the sense that it contributes to the resistance change of the transducer when a temperature change of the structure occurs. However, since the p-type region or substrate below the junction is not in the current flow path, changes in the resistance of the p-type region do not affect the resistance change of the transducer when a temperature change of the structure occurs. For this reason, the resistivity of the p-type region 26 may be any desired value including a high resistivity value if desired and is chosen to produce the most effective junction, that is, the junction providing the most effective potential barrier. As will be appreciated by those skilled in the art, the problem of providing the most effective barrier is a subtle one and the effectiveness of the junction in providing isolation of the current in the n-type layer may be enhanced by the proper empirical choice of the resistivities for the regions 25 and 26.

It is apparent that the structure disclosed in FIG. 9 will be very highly responsive because the large amount of the n-type layer 25 which is effective reduces the effect of heat-sinking by the connecting wires and because the resistance of the transducer is dependent only on the average temperature of the n-type layer at any instant and is independent of the temperature of the semiconductor material below the junction.

The structure disclosed in FIG. 10 is identical to that disclosed in FIG. 9 except that the layer 29 above the junction is p-type of high resistivity and the substrate 30 below the junction is n-type. All considerations are otherwise the same for the structures disclosed in FIG. 10 and FIG. 9.

The structure disclosed in FIG. 11 is identical to that disclosed in FIG. 9 except that two small and very thin metal spots or strips 31 and 32 are affixed to the surface of the n-type layer, for example, by vapor deposition of the metal through a mask adapted to the purpose, as will be understood by those skilled in the art. The spots or strips are at a prescribed distance apart and can be especially shaped in plan view to produce useful geometric advantages. The spots or strips may be, but are not necessarily, alloyed into the n-type layer 33 by raising the structure to the eutectic temperature for the metal-semiconductor system, as will be understood by those skilled in the art, to assure ohmic contact between the spots or strips and the n-type layer. The connecting wire 34 is fastened to one of the spots or strips and the connecting wire 35 is connected to the other spot or strip. The purpose of the spots or strips is two fold: first, to assure that the connecting wires make excellent low resistance ohmic contact to the n-type layer and second, to distribute the potential of the connecting wire over a large area of the n-type layer which increases the cross-sectional path of the flow of the measuring current. These effects result in minimizing the heat-sinking of the lead wires thus producing extremely high response of the transducer and result in reducing the overall resistance of the transducer to any desired value above some minimum dependent upon the size and shape of the spots or strips, the thickness of the layer, the resistivity of the layer, and the size of the transducer in plan view. In the structure disclosed in FIG. 11, a junction is understood to be formed which causes isolation of the current in the n-type layer. In all respects except for the addition of the metal spots or strips, all considerations are the same for the structures disclosed in FIG. 11 and FIG. 9, especially with regard to the isolation of the current flow, the resistivity of the materials and the manner of producing the n-type layer.

The structure disclosed in FIG. 12 is identical to that disclosed in FIG. 11 except that the layer 36 above the junction is p-type of high resistivity and the substrate 37 below the junction is n-type. All considerations are otherwise the same for the structures disclosed in FIG. 12 and FIG. 11.

The structure disclosed in FIG. 13 consists of any one of the structures depicted in FIG. 1 through FIG. 12, but with the addition of connecting leads 38 and 39 which are connected as ohmic contacts to the substrate at a specified distance apart. The most responsive of the structures disclosed in FIG. 1 through FIG. 12 is understood to be incorporated most commonly in the construction of the structure disclosed in FIG. 13. The connecting leads 38 and 39 are provided in order to supply heating current to the substrate whenever desired, the heating current being necessary whenever the structure disclosed in FIG. 13 is used as the transducer in a system used to measure the fluctuating velocity component as a function of time in a fluid stream.

In any of the structures disclosed in FIG. 1 through FIG. 13 it is to be understood that photo mask and chemical etch techniques are to be used as beneficial to the stability, sensitivity, and particularly as beneficial to the response and ruggedness of the transducer to provide any shape desired for the plan view of the active portion of the structure and also to provide precise non-shorting boundaries for the active portion of the structure at the plane at which it joins the substrate. In particular, in the structure disclosed in FIG. 13 it is to be understood that photo mask and etch techniques are to be used to produce any desired shape for the active portion of the structure which is beneficial to the response or beneficial to the ability of the transducer to discriminate between velocity components in the different coordinate directions in a fluid flow.

It is furthermore to be understood that the transducers consisting of any of the structures disclosed in FIG. 1 through FIG. 13 will in practice be mounted or fastened in any of several manners to a supporting probe or an enclosing jacket or other support and will furthermore be connected to associated circuitry external to the transducer including readout devices. The manner of support and the manner of connecting the larger circuit lead wires to the connecting wires attached to the transducer is strongly dependent on the requirements of specific applications of the transducers and is not the subject of the present invention because the manner of support and the design of the probes, shields or protective jackets is a matter of common practice well known by those skilled in the art as obvious and routine in the various applications of temperature transducers of other structures and designs.

It is furthermore to be understood that the transducers consisting of the structures disclosed in FIG. 1 through FIG. 13, when in practice they are properly supported by a probe structure will be installed in associated circuitry and readout devices external to the transducer and which will supply and control the measurement current and monitor and measure and display the resistance of the transducer either as an average value if desired or as a function of time if desired. The kind and quality and arrangement of the external circuitry and the readout devices to be used will be obvious to those skilled in the art, being essentially identical to that used with thermistors, metal resistance transducer and hot-wire anemometers and therefore the external circuitry and readout devices are not within the subject of the present invention.

It is furthermore to be understood that in the structures disclosed in FIG. 1 through FIG. 13, it will in certain cases be possible and desirable to effect the connections necessary to the surface of the layer and when applicable to the substrate by other means than by the use of connecting wires. In particular, it is to be understood that the alternative use of deposited or plated films as connecting electrical leads is intended. Such plated or deposited film leads commonly of metal are particularly common in the fabrication of silicon devices but are also possible and desirable in the fabrication of germanium devices and other semiconductor devices, as will be understood by those skilled in the art. The use of deposited or plated leads in substitution for the wires is primarily intended to increase the ruggedness of the resulting transducer but may also have additional desirable effects.

It is furthermore to be understood that in the structures disclosed in FIG. 1 through FIG. 13 the use of two or of several connecting wires to effect larger current flow paths to the structures and to effect making larger portions of the layer to be active is a part of the present invention being an expedient to promote low transducer resistance, high transducer stability and reliability, high transducer sensitivity and high transducer response and being simply a way to achieve these ends which is equivalent to using larger and especially shaped connecting wires and not being essentially different from the devices disclosed in FIG. 1 through FIG. 13 in construction or in effect.

It will be obvious to those skilled in the art that various modifications of the present invention may be resorted to in a manner limited only by a just interpretation of the following claim.

What is claimed is:

A semiconductor temperature transducer device, comprising:

(a) a unitary body of single crystalline germanium semiconductor material having a substrate portion with two major surfaces thereof and a layer portion contiguous one of said two major surfaces of said substrate portion, said layer portion being of the same conductivity type as said substrate portion, (b) said layer portion having an electrical resistivity ranging from .05 ohm-centimeter to almost intrinsic value, said substrate portion having an electrical resistivity lower than said layer portion so that temperature changes in said body do not substantially affect the resistance of said substrate portion but only said layer portion, (c) said layer portion being thinner than said substrate portion and being from .00001 inch to .003 inch, (d) means for connecting said body to external circuitry, said means including a pair of space ohmic contacts solely with said layer portion, and (e) second means for heating said substrate portion, said second means comprising a pair of ohmic contacts with said substrate portion.

References Cited

UNITED STATES PATENTS

| | | | |
|---|---|---|---|
| 2,692,839 | 10/1954 | Christensen et al. | 338—22 |
| 2,871,427 | 1/1959 | Tyler et al. | 338—22 |
| 2,954,551 | 9/1960 | Doucette et al. | 338—2 |
| 3,003,900 | 10/1961 | Levi | 338—2 |
| 3,049,685 | 8/1962 | Wright | 338—2 |
| 3,061,739 | 10/1962 | Stone et al. | 338—22 |
| 3,132,408 | 5/1964 | Pell | 338—2 |
| 3,165,811 | 1/1965 | Kleimack et al. | 148—33 |
| 3,252,321 | 5/1966 | Pfann | 73—88.5 |
| 3,270,554 | 9/1966 | Pfann | 338—2 |

RICHARD M. WOOD, *Primary Examiner.*

W. D. BROOKS, *Assistant Examiner.*